(12) United States Patent
Cope

(10) Patent No.: US 7,123,711 B1
(45) Date of Patent: Oct. 17, 2006

(54) CALL HANDLING SYSTEM AND METHOD

(75) Inventor: Warren B. Cope, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 749 days.

(21) Appl. No.: 10/403,160

(22) Filed: Mar. 31, 2003

(51) Int. Cl.
*H04M 7/00* (2006.01)

(52) U.S. Cl. .................................. 379/221.14

(58) Field of Classification Search ........... None
See application file for complete search history.

(56) References Cited

U.S. PATENT DOCUMENTS

| | | | |
|---|---|---|---|
| 5,418,844 A | 5/1995 | Morrisey et al. | |
| 5,448,633 A | 9/1995 | Jamaleddin | |
| 5,524,146 A | 6/1996 | Morrisey et al. | |
| 5,566,235 A | 10/1996 | Hetz | |
| 5,572,583 A | 11/1996 | Wheeler, Jr. et al. | |
| 5,590,187 A | 12/1996 | Greenspan | |
| 5,675,635 A | 10/1997 | Vos et al. | |
| 5,684,866 A | 11/1997 | Florindi et al. | |
| 5,694,463 A | 12/1997 | Christie et al. | |
| 5,793,853 A | 8/1998 | Sbisa | |
| 5,825,780 A | 10/1998 | Christie | |
| 5,828,740 A | 10/1998 | Khuc et al. | |
| 5,864,614 A | 1/1999 | Farris et al. | |
| 5,920,562 A | 7/1999 | Christie et al. | |
| 5,923,745 A | 7/1999 | Hurd | |
| 5,926,538 A | 7/1999 | Deryugin et al. | |
| 5,933,486 A | 8/1999 | Norby et al. | |
| 5,949,869 A | 9/1999 | Sink et al. | |
| 5,987,118 A | 11/1999 | Dickerman et al. | |
| 5,993,486 A | 11/1999 | Tomatsu | |
| 6,075,855 A | 6/2000 | Christiansen et al. | |
| 6,097,803 A | 8/2000 | Sbisa | |
| 6,148,069 A | 11/2000 | Ekstrom et al. | |
| 6,215,864 B1 | 4/2001 | Goyal et al. | |
| 6,262,992 B1 | 7/2001 | Nelson et al. | |
| 6,470,081 B1 | 10/2002 | Sbisa et al. | |
| 6,529,504 B1 | 3/2003 | Sbisa | |
| 6,567,659 B1 | 5/2003 | Sbisa | |
| 6,574,319 B1 | 6/2003 | Latter et al. | |
| 6,603,851 B1 | 8/2003 | Smith et al. | |
| 6,611,590 B1 | 8/2003 | Lu et al. | |

(Continued)

FOREIGN PATENT DOCUMENTS

DE     199 54 224 A 1     5/2001

(Continued)

OTHER PUBLICATIONS

Dehni, Tarek, et al., "Intelligent Networks and the HP OpenCall Technology," Aug. 1997 Hewlett-Packard Journal, Article 6, XP-002259853, pp. 1-14.

(Continued)

*Primary Examiner*—Creighton Smith

(57) ABSTRACT

A call handling system for a call comprising a routing system configured to receive a key from a first call system and responsively transfer a query to a call processing system wherein the query indicates the key and wherein the call processing system is configured to receive the key and process the key by placing the key into a dialed number information service (DNIS) override field of a query response and is configured to transfer the query response to the routing system, and wherein the routing system is further configured to receive the query response and responsively send the key as DNIS to a second call system. The technology improves call handling capabilities of a call handling system thereby saving time and allowing for improved call handling efficiencies.

21 Claims, 8 Drawing Sheets

U.S. PATENT DOCUMENTS

| | | |
|---|---|---|
| 6,690,656 B1 | 2/2004 | Christie et al. |
| 7,003,088 B1 * | 2/2006 | Cope et al. ............ 379/221.14 |
| 2004/0032864 A1 | 2/2004 | Sbisa et al. |

FOREIGN PATENT DOCUMENTS

| | | |
|---|---|---|
| EP | 0 631 441 A2 | 12/1994 |
| EP | 0 901 297 A2 | 3/1999 |
| WO | WO 99/35859 | 7/1999 |
| WO | WO 00/42782 | 7/2000 |

OTHER PUBLICATIONS

Briere, Daniel, "Sprint plans sweeping Network Revisions," Network World, Sep. 20, 1993, Network World, Inc.

* cited by examiner

CALL HANDLING SYSTEM AND METHOD

BACKGROUND OF THE INVENTION

1. Field of the Invention

The invention is related to the field of communications, and in particular, to a system and method for call handling.

2. Description of the Prior Art

An enormous number of calls are placed daily from callers to call centers that provide customer support services. Currently, network configurations that support the customer support services include service platforms, interactive voice response units (IVRs), automatic call distributors (ACDs), live agents at a call center that interact with callers, and computers with customer databases. Of the hundreds of thousands of calls placed each day destined for call centers, a large percentage are handled automatically by the IVRs and other similar communications equipment. However, an even greater percentage of calls require handling by live call agents.

One method of handling a call that requires interaction with a live call agent includes routing the incoming call to a service platform that further routes the call to an IVR. The IVR prompts the call for information such as the caller's social security number or a service requested by the caller. Based upon the caller entered information the call must be redirected to a live call agent. To accomplish the redirection, the call leg between the service platform is torn down and a new call leg is established from the service platform to the live call agent.

As a consequence of this method, the network does not retain the caller entered information for access by the live call agent. Thus, the live call agent must re-prompt the caller for the same information previously entered. This method serves to irritate callers who would prefer not to provide information twice, and it irritates the call agents who must interface with the callers. Furthermore, the amount of time that the live agent spends re-gathering the information multiplied by the enormous number of calls placed daily to call centers results in significant call handling inefficiencies.

SUMMARY OF THE INVENTION

The invention helps solve the above problems with technology that improves call handling. Advantageously, the technology eliminates the need for live operators to re-prompt a caller for previously entered caller information thereby saving time and allowing for improved call handling efficiencies.

An example of the invention includes a call handling system for a call comprising a routing system configured to receive a key from a first call system and responsively transfer a query to a call processing system wherein the query indicates the key and wherein the call processing system is configured to receive the key and process the key by placing the key into a dialed number information service (DNIS) override field of a query response and is configured to transfer the query response to the routing system, and wherein the routing system is further configured to receive the query response and responsively send the key as DNIS to a second call system.

Another example of the invention includes a method of handling a call, the method comprising in a routing system receiving a key from a first call system, responsively transferring a query indicating the key to a call processing system, in the call processing system receiving the key and placing the key into a dialed number information service (DNIS) override field of a query response, transferring the query response including the key in a dialed number information service (DNIS) override field, and in the routing system receiving the query response and transferring the key as DNIS to a second call system.

BRIEF DESCRIPTION OF THE DRAWINGS

The same reference number represents the same element on all drawings.

DETAILED DESCRIPTION OF THE PREFERRED EMBODIMENT

FIGS. 1–8 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
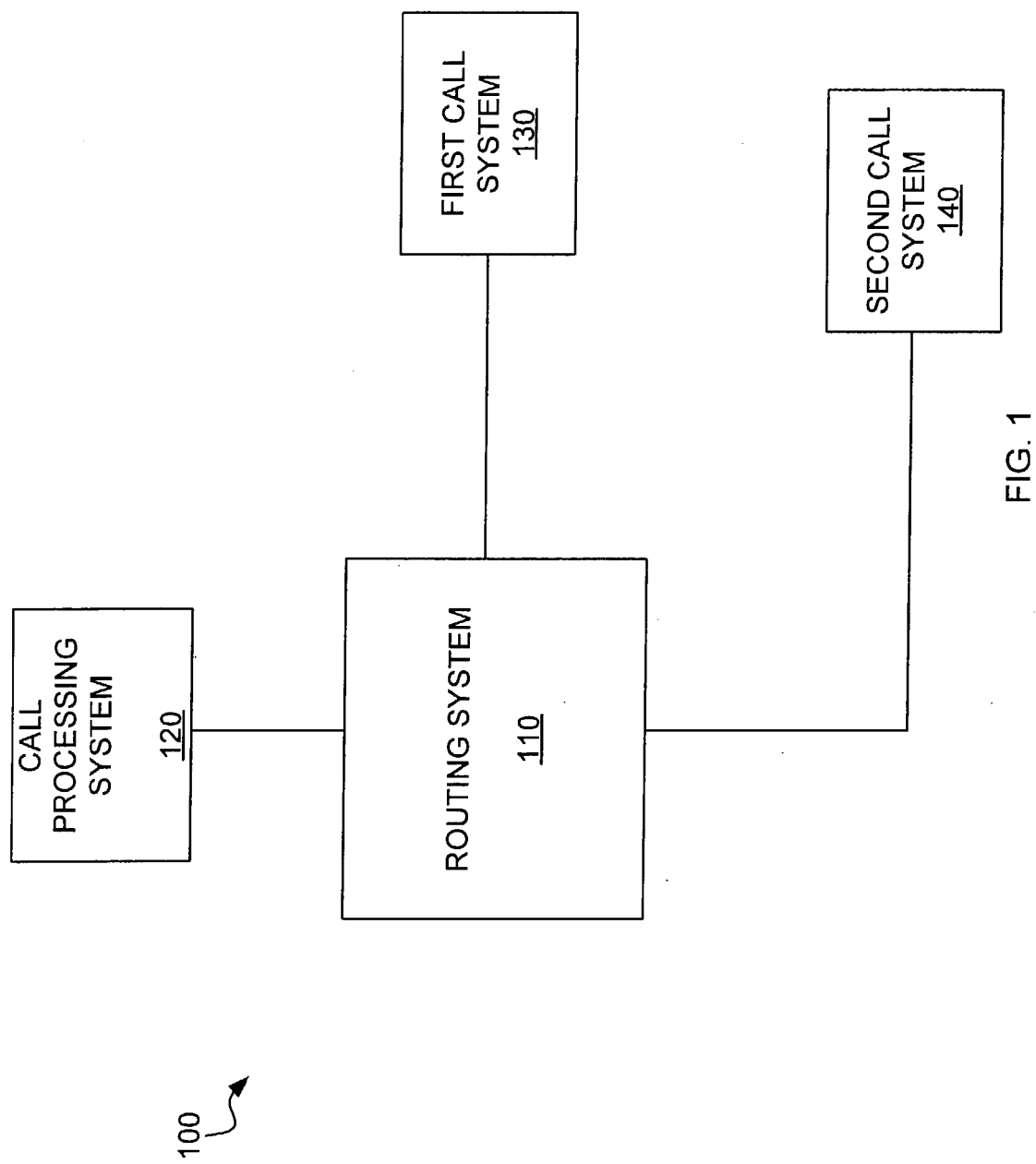
FIG. 1 illustrates a call handling system in an example of the invention.
Figure 2:
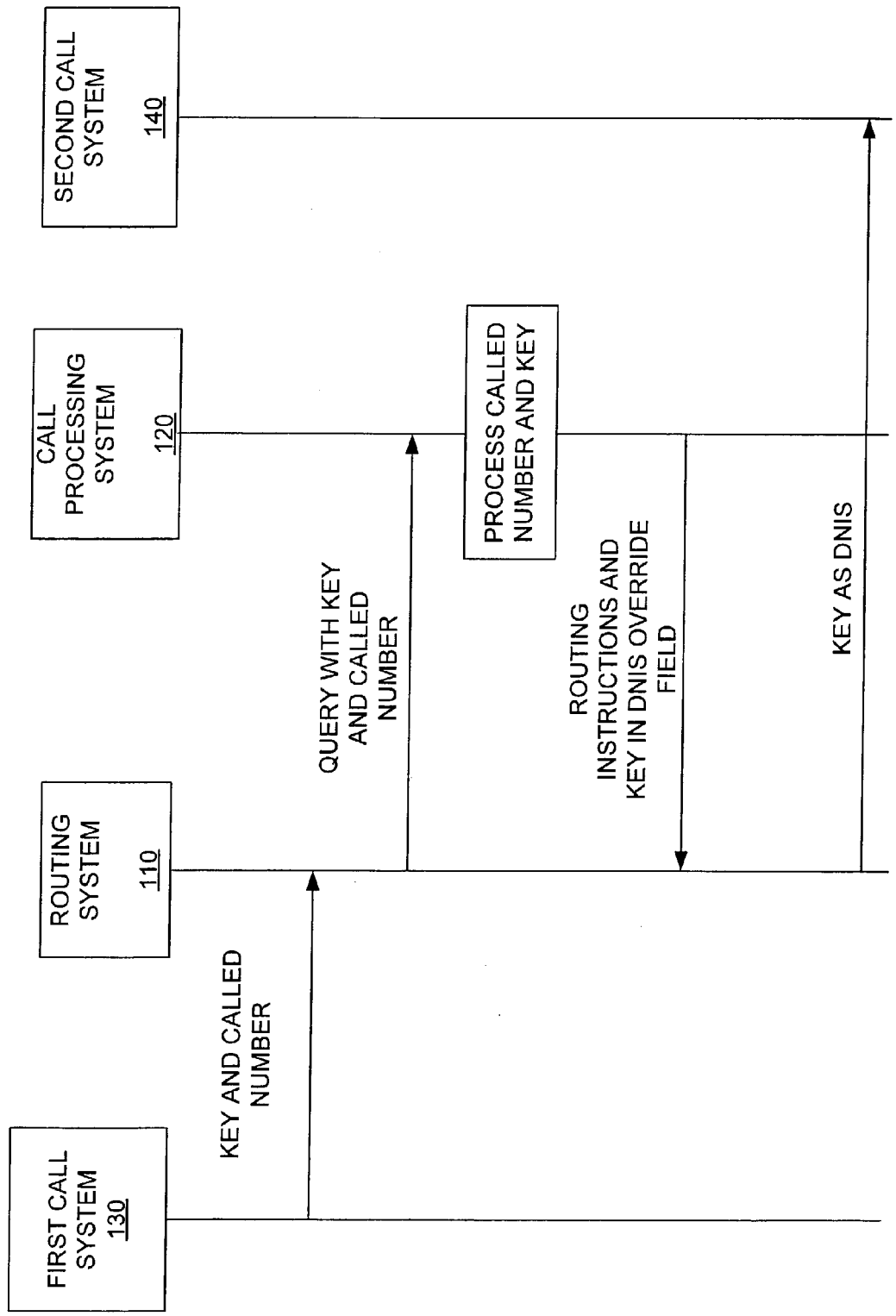
FIG. 2 illustrates the operation of a call handling system in an example of the invention.

First Embodiment Configuration and Operation—FIGS. 1–2

FIG. 1 illustrates call handling system 100 in an embodiment of the invention. Routing system 110 is connected to call processing system 120, first call system 130, and second call system 140. Routing system 110 could include a collection of Public Switched Telephone Networks (PSTNs). Routing system 110 could also include a service platform connected to the PSTNs. Call processing system 120 could include a Service Control Point (SCP) or a similar processing system. First call system 130 comprises an automatic call distribution group (ACD) including an interactive voice response unit (IVR). First call system 130 could also include a remote processor (RP). Second call system 140 comprises an ACD including a live operator.

FIG. 2 illustrates the operation of call handling system 100 in an embodiment of the invention. First call system 130 transfers a key and a called number to routing system 110. Routing system 110 receives the key and called number and responsively transfers a query to call processing system 120 indicating the key and called number. Call processing system 120 receives the query and in response processes the called number to determine routing instructions associated with the called number. Call processing system 120 processes the key by placing the key into a dialed number information service (DNIS) override field of a response to the query. Call processing system 120 transfers the response having the key in the DNIS override field and including the routing instructions to routing system 110. Routing system 110 receives the response and responsively sends the key as DNIS to second call system 140.

Figure 3:
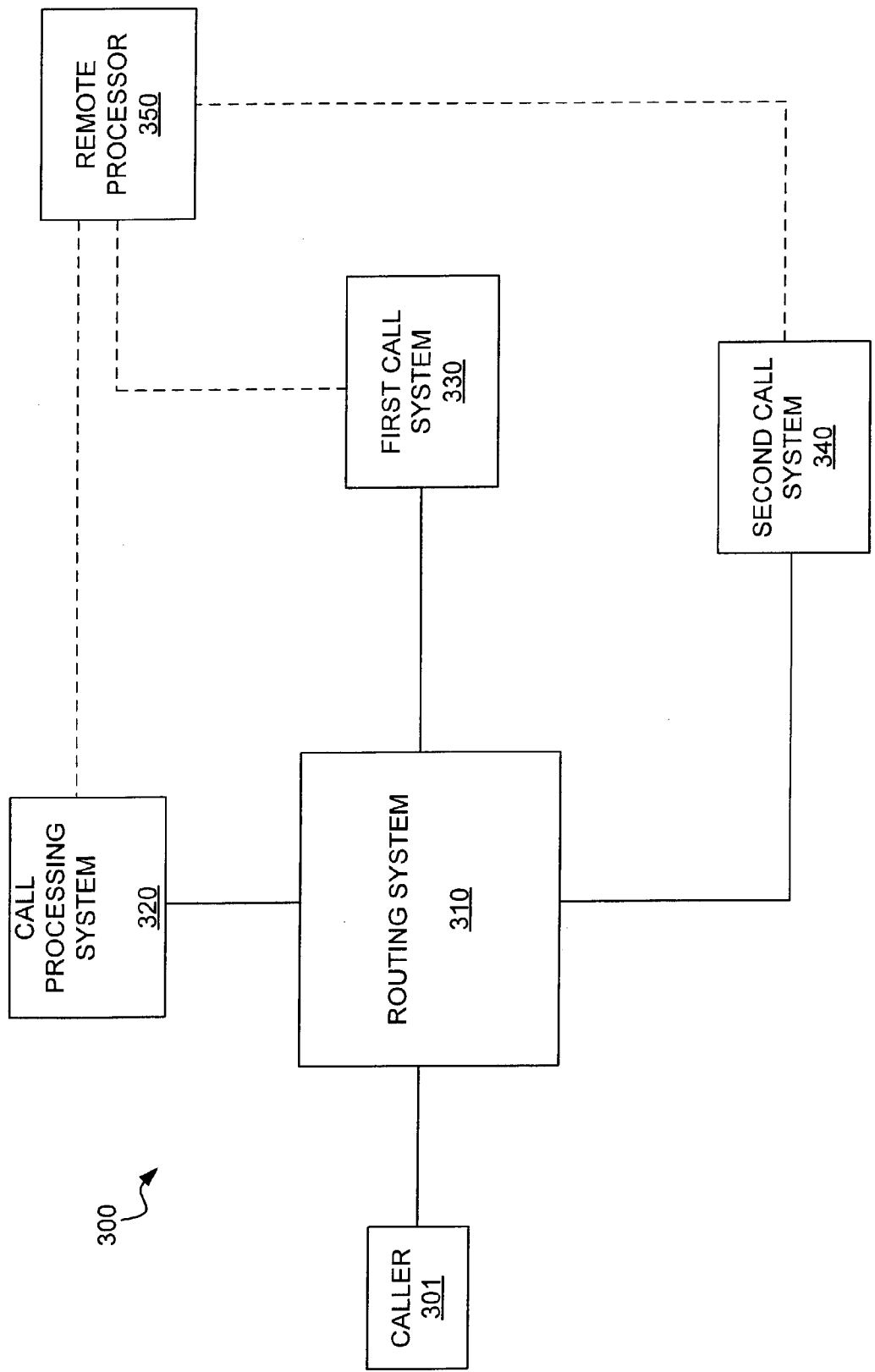
FIG. 3 illustrates a call handling system in an example of the invention.
Figure 4:
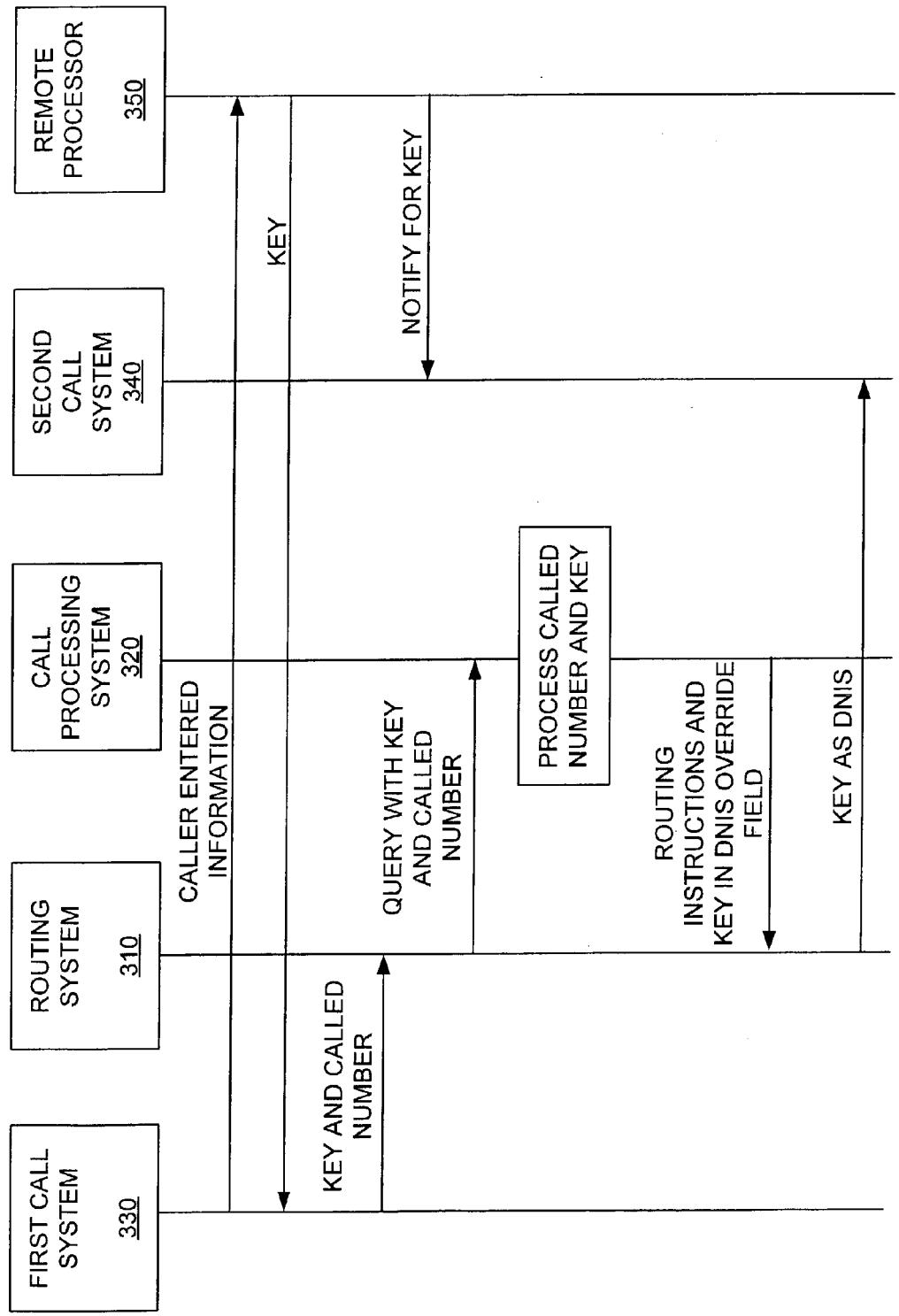
FIG. 4 illustrates the operation of a call handling system in an example of the invention.

Second Embodiment Configuration and Operation—FIGS. 3–4

FIG. 3 illustrates call handling system 300 in an embodiment of the invention. Routing system 310 is connected to caller 301, call processing system 320, first call system 330, and second call system 340. Remote processor 350 is connected to call processing sytem 320, first call system 330, and second call system 340. Routing system 310 could include a collection of PSTNs. Routing system 310 could also include a service platform connected to the PSTNs. Call processing system 320 could include a Service Control Point (SCP) or a similar processing system. First call system 330 comprises an automatic call distribution group (ACD) including interactive voice response unit (IVR). Second call system 340 comprises an ACD including a live operator.

FIG. 4 illustrates the operation of call handling system 300 in an embodiment of the invention. First call system 330 transfers caller entered information gathered during a call to remote processor 350. Remote processor 350 receives the caller entered information and processes the information to determine a key associated with the call. Remote processor transfers the key to first call system 330. First call system 330 transfers a key and a called number to routing system 310. Routing system receives the key and called number and responsively transfers a query to call processing system 320 indicating the key and called number. Call processing system 320 receives the query and in response processes the called number to determine routing instructions associated with the called number. Call processing system 320 processes the key by placing the key into a dialed number information service (DNIS) override field of a response to the query. Call processing system 320 transfers the response having the key in the DNIS override field and including the routing instructions to routing system 310. Routing system 310 receives the response and responsively sends the key as DNIS to second call system 340.

Figure 5:
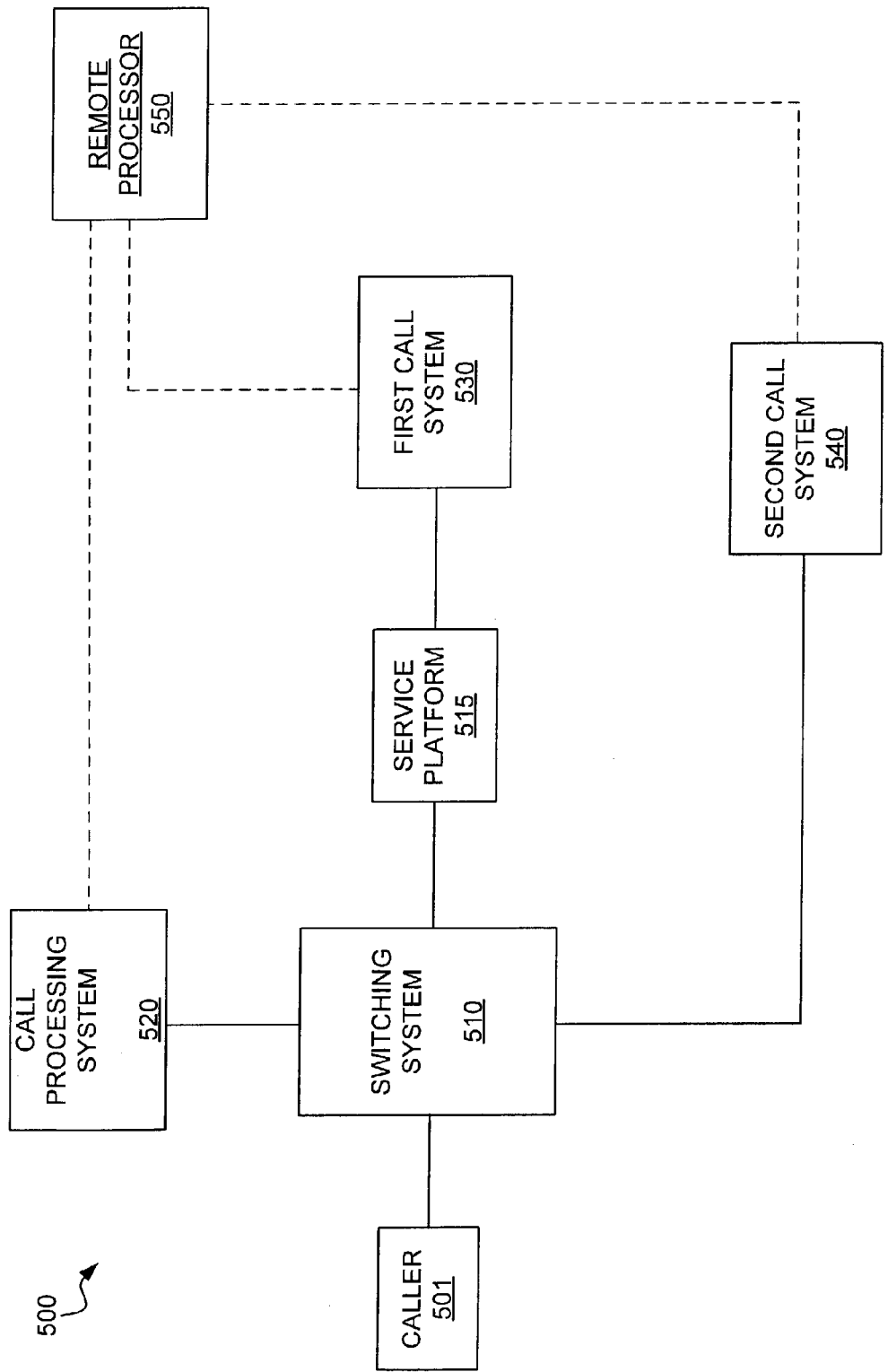
FIG. 5 illustrates a call handling system in an example of the invention.

Third Embodiment Configuration—FIG. 5

FIG. 5 illustrates call handling system 500 in an embodiment of the invention. Switching system 510 is connected to caller 501, call processing system 520, second call system 540, and service platform 515. Service platform 515 is connected to first call system 530. Remote processor 550 is connected to call processing system 520, first call system 530, and second call system 540. Switching system 510 could be a switch of the PSTN. Call processing system 520 could include a Service Control Point (SCP) or a similar processing system. First call system 530 comprises an automatic call distribution group (ACD) including interactive voice response unit (IVR). Second call system 540 comprises an ACD including a live operator.

The following is a discussion of the operation of call handling system 500. The call is connected from caller 501 through switching system 510 to service platform 515. The caller is prompted by service platform 515 for caller entered information such as a personal identification number, social security number, or other such identifying information. Service platform 515 responsively routes the call to first call system 530. First call system 530 gathers further caller entered information from the caller and sends an RP query to RP 550 including the caller entered information. RP 550 processes the information to determine call handling instructions for the call. RP 550 further determines a key associated with the caller entered information and transfers a query response including the key to first call system 530. First call system 530 issues a DTMF transfer command having the key and a called number. For instance, the transfer command would be *8-DNIS-800-555-1212 wherein the "*8" signals a call transfer to service platform 515, the key is delivered as DNIS, and the 800 number indicates the translation routing label for a second leg of the call.

Service platform 515 receives the transfer command and responsively tears down the first circuit to first call system 530. Service platform 515 next out-dials the 800 number including the key as DNIS. Switching system 510 responsively queries call processing system 520 with the key and 800 number to determine routing instructions for the call. Call processing system 520 translates the 800 number for routing instructions, processes the key by placing it in the DNIS override field of a query response, and transfers the query response to switching system 510. Switching system routes the call according to the routing instructions including sending the key as DNIS. Second call system receives the call including the key as DNIS and queries RP 550 with the key to access the caller entered information associated with the key.

Figure 6:
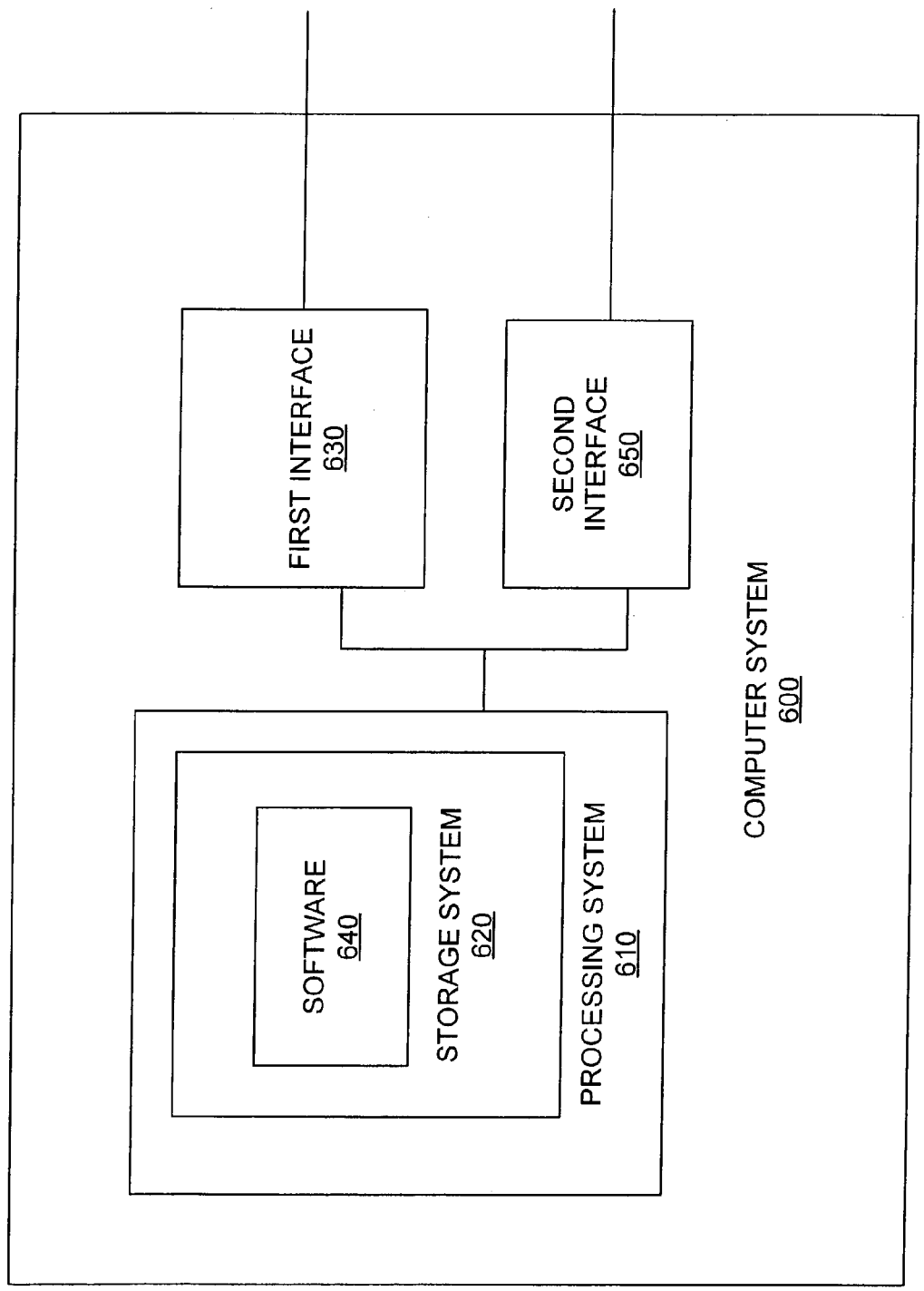
FIG. 6 illustrates a computer system in an example of the invention.

Computer System Configuration—FIG. 6

FIG. 6 illustrates computer system 600 that could be used to implement aspects of the invention. In particular, computer system 600 could be used in call handling system 100, 300, or 500, or in another communication system. Computer system 600 includes processing system 610, storage system 620, software 640, first interface 630, and second interface 650. Storage system 620 stores software 640. Processing system 610 is linked to first interface 630 and second interface 650. Computer system 600 could be comprised of programmed general-purpose computers, although those skilled in the art will appreciate that programmable or special purpose circuitry and equipment may be used. Computer system 600 may use a client server architecture where operations are distributed among a server system and client devices that together comprise elements 610–650.

First interface 630 could comprise a network interface card, modem, port, or some other communication device. First interface 630 may be distributed among multiple communication devices. Processing system 610 could comprise a computer microprocessor, logic circuit, or some other processing device. Processing system 610 may be distributed among multiple processing devices. Second interface 650 could comprise a keyboard, mouse, voice recognition interface, microphone and speakers, graphical display, touch screen, or some other type of user device. Storage system 620 could comprise a disk, tape, integrated circuit, server, or some other memory device. Storage system 620 may be distributed among multiple memory devices.

Processing system 610 retrieves and executes software 640 from storage system 620. Software 640 may comprise an operating system, utilities, drivers, networking software, and other software typically loaded onto a general-purpose computer. Software 640 could also comprise an application program, firmware, or some other form of machine-readable processing instructions. When executed by the processing system 610, software 640 directs the processing system 610 to operate as described for call handling system 100, 300, and 500.

Figure 7:
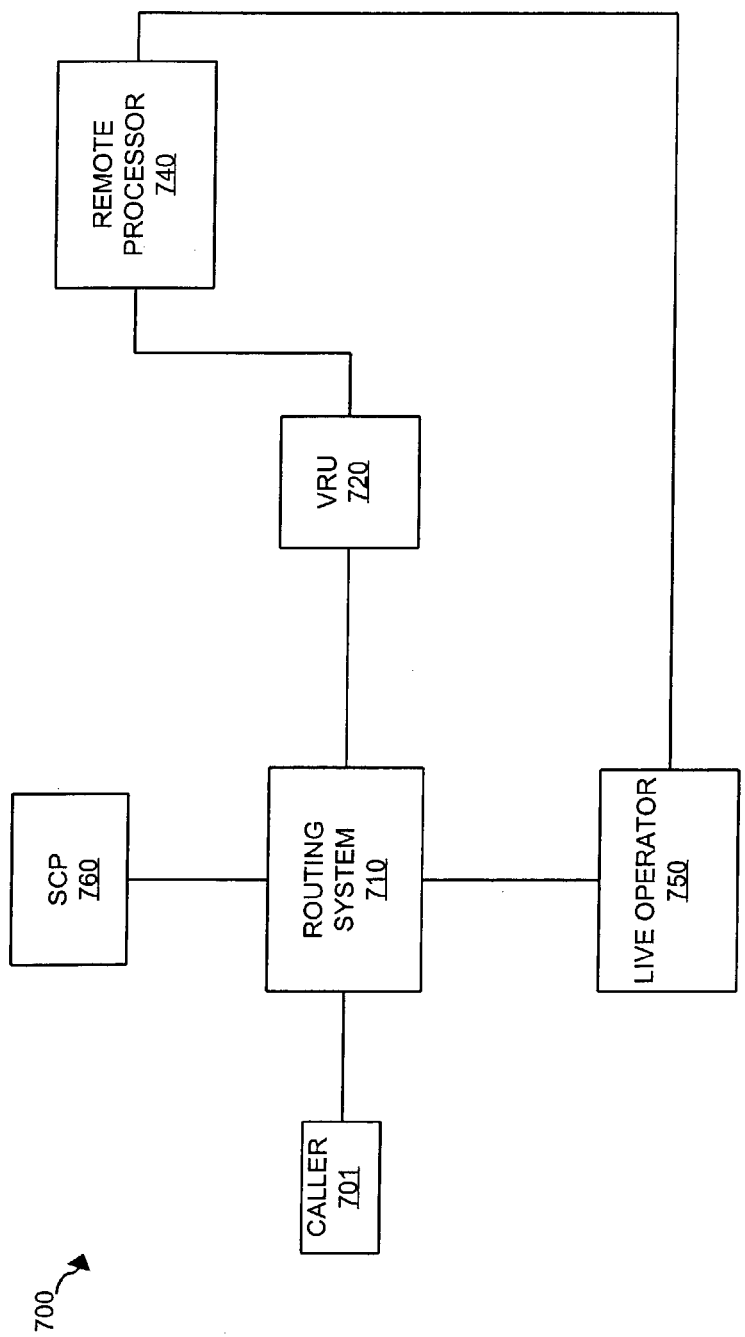
FIG. 7 illustrates a call handling system in an example of the invention.
Figure 8:
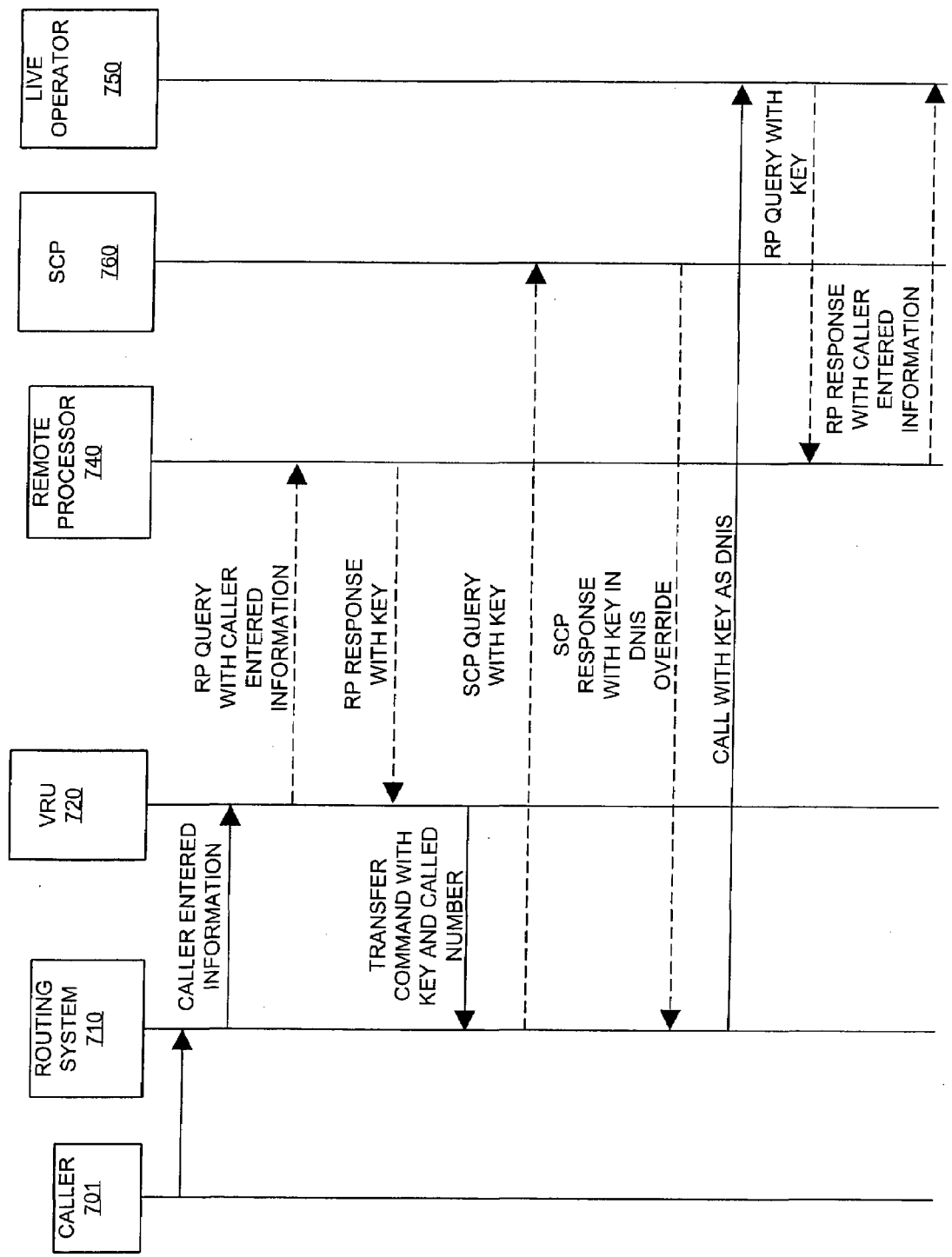
FIG. 8 illustrates the operation of a call handling system in an example of the invention.

Live Operator Example of the Invention—FIGS. 7–8

FIG. 7 illustrates call handling system 700 in an embodiment of the invention. Routing system 710 is connected to caller 701, SCP 760, voice recognition unit (VRU) 720, and live operator 750. Remote processor (RP) 740 is connected to VRU 720 and live operator 750. Routing system 710 could be a switch of the PSTN.

FIG. 8 illustrates the operation of call handling system 700 in an embodiment of the invention. The call is connected from caller 701 through routing system 710 to VRU 720. The caller is prompted by VRU 720 for caller entered information such as a personal identification number, social security number, or other such identifying information. VRU 720 sends an RP query to RP 740 including the caller entered information. RP 740 processes the information to determine call handling instructions for the call. RP 740 further determines a key associated with the caller entered information. RP 740 transfers a query response including the key to VRU 720. VRU 720 issues a DTMF transfer command having the key and a called number. Routing system receives the transfer command and responsively transfers an SCP query with the key to SCP 760. SCP 760 processes the key by placing the key in the DNIS override field of a query response and transfers the response to the routing system including the key and routing instructions. Routing system 710 connects caller 701 to live operator 750 in accordance with the routing instructions and sends the key as DNIS to live operator 750. Live operator 750 sends an RP query with the key to RP 740. RP 740 responsively transfers the correct caller entered information in an RP response to live operator 750, thereby eliminating time spent by the live operator re-gathering previously entered caller information.

What is claimed is:

1. A call handling system for a call comprising:
a routing system configured to receive a key from a first call system and responsively transfer a first query to a call processing system wherein the first query indicates the key;
the call processing system configured to receive the key and process the key by placing the key into a dialed number information service (DNIS) override field of a first query response and configured to transfer the first query response to the routing system; and
the routing system further configured to receive the first query response and responsively send the key as DNIS to a second call system.

2. The call handling system of claim 1 wherein the first call system is configured to receive caller entered information over the call and transfer the caller entered information to a remote processor and wherein the first call system is further configured to receive the key and call handling instructions from the remote processor and in response send the key to the routing system.

3. The call handling system of claim 2 wherein the remote processor is configured to receive the caller entered information from the first call system and process the caller entered information to determine call handling instructions for the call and configured to associate the key with the caller entered information and transfer the key and the call handling instructions to the first call system.

4. The call handling system of claim 3 wherein the second call system is configured to receive the key from the routing system and transfer a second query to the remote processor indicating the key wherein the remote processor processes the key and transfers a second query response to the second call system including the caller entered information associated with the key.

5. The call handling system of claim 1 wherein the routing system is configured to receive a called number from the first call system and responsively transfer the first query to the call processing system wherein the first query indicates the key and the called number.

6. The call handling system of claim 5 wherein the call processing system is configured to receive the key and the called number and process the called number to determine routing instructions for the call and process the key by placing the key into the dialed number information service (DNIS) override field of the first query response and configured to transfer the first query response to the routing system including the routing instructions.

7. The call handling system of claim 5 wherein the routing system is configured to receive the key and the called number in a transfer command.

8. The call handling system of claim 7 wherein the transfer command comprises a dual tone multi-frequency (DTMF) command.

9. The call handling system of claim 1 wherein the routing system comprises a switch within the Public Service Telephone Network (PSTN).

10. The call handling system of claim 1 wherein the call processing system comprises a Service Control Point (SCP).

11. The call handling system of claim 1 wherein the remote processor is configured to determine the key based upon the caller entered information and the second call system is configured to associate the key with the caller entered information.

12. A method of handling a call, the method comprising:
in a routing system, receiving a key from a first call system, responsively transferring a first query indicating the key to a call processing system;
in the call processing system, receiving the key and placing the key into a dialed number information service (DNIS) override field of a first query response, transferring the first query response including the key in the dialed number information service (DNIS) override field; and
in the routing system, receiving the first query response and responsively transferring the key as DNIS to a second call system.

13. The method of claim 12 further comprising in the first call system receiving caller entered information over the call and transferring the caller entered information to a remote processor and receiving the key and call handling instructions from the remote processor and in response sending the key to the routing system.

14. The method of claim 13 further comprising in the remote processor receiving the caller entered information from the first call system and determining call handling instructions for the call based on the caller entered information and associating the key with the caller entered information and transferring the key and the call handling instructions to the first call system.

15. The method of claim 14 further comprising in the second call system receiving the key as DNIS from the routing system and transferring a second query to the remote processor indicating the key and in the remote processor processing the key and transferring a second query response to the second call system including the caller entered information associated with the key.

16. The method of claim 12 further comprising receiving a called number from the first call system and responsively transferring the query to the call processing system wherein the query indicates the key and the called number.

17. The method of claim 16 further comprising in the call processing system processing the called number to determine routing instructions for the call and transferring the first query response to the routing system including the routing instructions.

18. The method of claim 17 wherein receiving the called number and the key from the first call system comprises receiving the called number and the key in a transfer command.

19. The method of claim 18 wherein the transfer command comprises a dual tone multi-frequency (DTMF) transfer command.

20. The method of claim 12 wherein the routing system comprises a switch within the Public Service Telephone Network (PSTN).

21. The method of claim 12 wherein the call processing system comprises a Service Control Point (SCP).

* * * * *